US008647565B2

(12) United States Patent
Procházka, Jr. et al.

(10) Patent No.: US 8,647,565 B2
(45) Date of Patent: Feb. 11, 2014

(54) MULTIFUNCTIONAL PHOTOCATALYTIC PAINT COAT AND METHOD OF PREPARATION THEREOF

(75) Inventors: Jan Procházka, Jr., Kamenné Žehrovice (CZ); Jan Procházka, Sr., Kamenné Žehrovice (CZ)

(73) Assignee: Advanced Materials—JTJ S.R.O., Kamenne Zehrovice (CZ)

( * ) Notice: Subject to any disclaimer, the term of this patent is extended or adjusted under 35 U.S.C. 154(b) by 402 days.

(21) Appl. No.: 12/746,813

(22) PCT Filed: Dec. 8, 2008

(86) PCT No.: PCT/CZ2008/000146
§ 371 (c)(1),
(2), (4) Date: Jun. 8, 2010

(87) PCT Pub. No.: WO2009/074120
PCT Pub. Date: Jun. 18, 2009

(65) Prior Publication Data
US 2010/0254851 A1    Oct. 7, 2010

(30) Foreign Application Priority Data

Dec. 11, 2007 (CZ) ................ PV 2007-865

(51) Int. Cl.
*A61L 11/00* (2006.01)
(52) U.S. Cl.
USPC .................... 422/5; 106/286.4; 106/436
(58) Field of Classification Search
USPC ................... 106/286.4, 436; 422/5
See application file for complete search history.

(56) References Cited

FOREIGN PATENT DOCUMENTS

| CN | 1405236 A | 3/2003 |
|---|---|---|
| CN | 1696228 | * 11/2005 |
| CN | 1912031 A | 2/2007 |
| CZ | 2006829 A3 | 7/2008 |
| DE | 203 06 431 U1 | 9/2004 |
| WO | WO 2005/044446 A1 | 5/2005 |

OTHER PUBLICATIONS

Czech Republic Search Report dated Nov. 11, 2008.
International Search Report (PCT/ISA/210) for PCT/CZ2008/000146 dated Jun. 24, 2009.
Written Opinion (PCT/ISA/237) for PCT/CZ2008/000146 dated Jun. 24, 2009 and Informal Comments dated Aug. 13, 2009.

* cited by examiner

*Primary Examiner* — Monique Cole
(74) *Attorney, Agent, or Firm* — Buchanan Ingersoll & Rooney PC

(57) ABSTRACT

The multifunctional paint is based on a highly porous inorganic substance created by a reaction of at least two components. $TiO_2$ nanoparticles are attached to the surface of this substance. The first component is a water insoluble calcium compound and the second component is a water soluble sulfate. The method of applying the multifunctional paint on the surface is that the first component containing the water suspension of the insoluble calcium compound is applied on the treated area first and subsequently a mixture of $TiO_2$ nanoparticles suspended in the water solution of the second component is applied over the first layer. Another way is to apply a water suspension of the first component containing also $TiO_2$ nanoparticles on the treated surface and then deposit the water solution of the second component on the layer. A mixture of all components can be also applied on the treated area at once.

2 Claims, 3 Drawing Sheets

MULTIFUNCTIONAL PHOTOCATALYTIC PAINT COAT AND METHOD OF PREPARATION THEREOF

TECHNICAL FIELD

The present invention relates to the multifunctional paints based on $TiO_2$ nanoparticles with photocatalytic and sanitary effects and the way of applying the paint on walls, painted surfaces and construction materials. The multifunctional coatings possess the covering, cleaning, sanitary, antibacterial, antimold, photocatalytic and other functionalities.

BACKGROUND OF THE INVENTION

The usage of modern plastics and air-recycling systems in the buildings require eliminating of the associated side-effects. Namely it is the slow release of undesirable aldehydes and roughly two hundred of other organic substances; and infections spreading through the HVAC systems into the whole building.

The fundamental functionalities of traditional paints and pigments always lie in the color and hiding power. However, there are an increasing number of attempts to add other functionalities to paints. From the historical point of view, the first such paint was lime, which, in the fresh form, functions as a white pigment and as a sanitary paint as well. Applications of the fundamental photocatalytic effect of $TiO_2$ nanoparticles are very popular in the last decade. Although the effectiveness of the photocatalytic effect of $TiO_2$ was examined very well, all problems with the application of $TiO_2$ in photoactive paints have not been satisfyingly solved yet.

If $TiO_2$ nanoparticles are mixed into the inorganic silicate paints, the surface of nanoparticles is typically encapsulated by silicon oxide ($SiO_2$) and the desiderative photocatalysis is blocked. This surface modification of $TiO_2$ pigment particles by $SiO_2$ is used in the pigment industry for almost a century to decrease the photocatalytic effect preventing the paint from chalking. The photocatalytic effect of the silicate based products is in the best case residual and it amounts to only percents or tenths of percent of the pure $TiO_2$ surface photocatalytic activity. $TiO_2$ nanoparticles are usually used to improve the rheology of the paint rather than for its photocatalytic effect in these types of composition.

The second most frequent practice of incorporating $TiO_2$ nanoparticles into the paint composition is to mix them directly into the acrylate based paints. The problem of such solution is in the photocatalytic aggresivity of $TiO_2$ nanoparticles, which upon illumination photochemically break down and literally burn the surrounding acrylate. The result is strong chalking and yellowing of the paint.

Utilization of $TiO_2$ nanoparticles in the silicone based paints also brings serious limitations. Silicones, similar to silicates, effectively block the $TiO_2$ surface eliminating the photocatalysis.

The application of sol-gel made $TiO_2$ nanoparticles directly on a surface is very costly and rather uncommon. The thickness of sol-gel $TiO_2$ spray coating is around 50 nm, Nanoparticles of $TiO_2$ stick to the wall electrostatically. The limitations of this technology are in the low purity of sol-gel $TiO_2$ nanocrystals and high acidity of the typical sol-gel precursors. Another problem is the low $TiO_2$ quantity in the thin coating that uses only a minimal fraction of the available light.

In the so far known paints based on the photocatalytic effect of $TiO_2$ nanoparticles, the photocatalysis is diminished because nanoparticles get surrounded by a substance contained in the paint composition, typically the binder. This slows the photocatalytic degradation of organic substances, especially cigarette smoke, some thinners, exhalations and aldehydes vaporized from the plastics on the painted surface.

SUMMARY OF THE INVENTION

The present invention of the multifunctional paints based on $TiO_2$ nanoparticles with photocatalytic and sanitary effects provides a solution to the above mentioned shortages.

According to the invention the paint consists of a highly porous inorganic substance which is created by a chemical reaction of at least two components. The $TiO_2$ nanoparticles are mounted onto the surface of the porous substance.

The first component is a water insoluble compound of calcium and the second component is a water soluble sulfate.

The insoluble calcium compound is preferably selected from the group of calcium carbonate, if possible with particle size in the nanometer range (further nano-calcium carbonate), lime or their mixtures.

The water soluble sulfate is preferably selected from the group of copper sulfate, zinc sulfate, silver sulfate or mixtures thereof.

The multifunctional paint preferably contains 5 to 90 wt % of $TiO_2$ in the solids creating a photocatalytic layer in the range from 0.1 to 100 micrometers in thickness.

The weight ratio of the second component (sulfate) to the first component (insoluble compound of calcium) is from 0.1:1 to 10:1.

The multifunctional paint favorably contains 3 to 80 wt % of nano-calcium carbonate in the solids.

In one embodiment of the invention, the method of application of the multifunctional coating is that the first component consisting of the water suspension of the insoluble calcium carbonate compound is deposited on the treated area. After that, the suspension of $TiO_2$ nanoparticles in a water solution of the second component (sulfate) is applied on the top of this coat.

In another embodiment of the invention, it is possible to apply all components simultaneously.

According to the invention, it is also practical to apply a coat of the component consisting of the water suspension of the insoluble compound of calcium with the suspended $TiO_2$ nanoparticles on the treated surface at first. In the following step a water solution of the second component (sulfate) is applied on the top of the first layer.

If the multifunctional paint is used to cover areas rich in insoluble compounds of calcium, namely stuccoed surfaces and concrete, it is possible to treat the areas only with the suspension of $TiO_2$ nanoparticles in a water solution of the second component (sulfate). The second component reacts together with the insoluble compounds of calcium creating a porous inorganic substance on the surface. The $TiO_2$ nanoparticles are mounted onto the surface of the formed porous substance.

The paint can be conveniently manufactured and applied at the room temperature, typically 10 to 50° C.

The multifunctional paint is preferably applied on the ceiling, because the air circulation is the most effective there. To increase the efficiency of photocatalytic odor removal, especially from smoking and cooking, it is possible to increase the air turbulence by mounting a fan on the ceiling and illuminating the ceiling with a UV lamp.

Cleaning of the paint coat and refreshing of its functionality is realized by an occasional illuminating of the painted area with an intensive source of UV light.

According to the invention, during the coating process a porous inorganic substance functioning as a binding agent is created. The porous substance (binder) does not block the photocatalytic activity of $TiO_2$ nanoparticles. Next to the binding inorganic structure, other active substances are created simultaneously during the reaction. These substances are present in the form of inorganic nanoparticles, which according to the choice of reacting agents enable specific functions of the paint.

The paint can be applied on the surface in one-step using a reacting mixture, where all components are present in the suspension.

The paint can also be applied in two or three steps, where in the initial step the first component of the reacting mixture is deposited on the treated surface and $TiO_2$ with the other components are applied on the top of it.

It is also possible to deposit $TiO_2$ with the first reactive component on the surface initially and then spray or paint the other reactive components on it.

It is convenient using calcium carbonate nanoparticles—$CaCO_3$ as the first component (FIG. 1B). Calcium carbonate nanoparticles are to the certain extent replaceable with coarser $CaCO_3$, lime—$CaO$ or better with calcium hydroxide—$Ca(OH)_2$.

Water soluble sulfates are used as a second component, primarily $CuSO_4$, $Ag_2SO_4$ and $ZnSO_4$ which in the chemical reaction with nano-calcium carbonate give a porous, acicular, fibrous or laminar structure consisting of gypsum ($CaSO_4 \cdot 2H_2O$) and freshly formed active nanoparticles of metal oxides and hydrated metal oxides with highly porous surface and very strong antibacterial properties.

FIGS. 2 A, B and C show the morphology of materials created by the reaction of the sulfates with the nano-calcium carbonate. Although the chemical composition of paints created by this method is not exactly defined, their preparation is consistently reproducible and the function of each component is obvious from the testing.

Based on antibacterial and photocatalytic tests performed with the materials, it is possible to assume that the function of nanoparticles created by the reaction of nano-calcium carbonate with zinc sulfate is in the ability to create strong antibacterial environment, which for instance additionally prevents gangrene and yeast from growth and spreading. The functionality of the surface is stronger in the presence of light. This disproportion can be caused by the photocatalytic property of ZnO.

The photocatalytic effect of $TiO_2$ nanoparticles mounted onto the surface of the porous substance created by the reaction of the insoluble calcium compounds with the sulfates causes decomposition of organic substances on the $TiO_2$ surface providing the paint antibacterial property and the ability to remove odors.

The functionality of nanoparticles produced by the reaction of copper sulfate with nano-calcium carbonate, is the prevention of mold from spreading and the antibacterial effect. The presence of copper based nanoparticles in the paint is desirable in locations where the mold prevention is necessary.

The functionality of nanoparticles created by the reaction of silver sulfate with nano-calcium carbonate is again antibacterial. The paint containing these nanoparticles can be conveniently used in poorly lighted places and at night, when the antibacterial activity of the photocatalytic $TiO_2$ is not sufficient.

According to the invention, it is possible to modify the paint properties to certain extent by changing the composition, or the concentration ratio of the components. It does not matter whether the paint is created "in situ" in several steps, or by mixing all components together before they are applied on a surface.

In order to ensure the functionalities mentioned above it is fundamental creating the porous structure partially consisting of gypsum. Gypsum is a side product of the sulfate reaction with the nano-calcium carbonate. Gypsum crystals bind the paint layer together, while they do not envelop clusters of nanoparticles of $TiO_2$ and the other active substances.

FIG. 2 D shows the structure composed of large gypsum crystals with the zinc based clusters of nanoparticles and $TiO_2$ incorporated onto it. The structure was created by the reaction of the components at the water boiling point. The temperature at which these paints are manufactured plays an important role. Generally, the range from 10° C. to 50° C. is the most convenient for both manufacturing and application of the paints. At lower temperature, a finer structure is created, but the reaction of the components is slower.

The most advantageous composition of the paint contains a sufficient amount of reacting substances, first to ensure the required functionality and second to create the porous gypsum based binding structure. The content of nano-calcium carbonate in the paint, potentially substitutable by calcium hydroxide, should be more than 3 and less than 80 wt % of the solids. The optimum ratio of nano-calcium carbonate in the paint is from 20 to 50 wt % of the solids.

The amount of the sulfate based compounds (second component) to the first component (nano-calcium carbonate) should be in the in the ratio from 0.1:1 to 10:1, depending on the character of the treated surface.

For proper odor removal and photodegradation of the organic compounds the amount of $TiO_2$ in the paint should be 10-90 weight percent of the solids, optimally 50 to 80 weight percent.

The thickness of the multifunctional paint coat necessary for the required functionality varies from 0.1 to 100 micrometers. To ensure the photocatalytic function of paint, thickness of the layer should be in the range from 1 to 10 micrometers, optimally 2 to 5 micrometers.

The invention describes the appearance and composition of the multifunctional paints. It also resolves the deposition of the cleaning and sanitary multifunctional paints on the surface. These paints are based on the combination of $TiO_2$ nanoparticles and reacting components, which, after they are mixed together, provide a highly porous inorganic substance with $TiO_2$ nanoparticles mounted onto its surface without blocking of their photocatalytic effect. In addition, the reacting components create other active compounds during the reaction. These newly formed compounds give the paint other desirable properties, namely antiviral and antibacterial effects, photocatalytic potency to decompose organic substances cleaning the air, eventually preventing mold and gangrene from spreading.

The effectiveness of the paint can be enhanced several times by increasing the air circulation and intensity of the light. For example this can be done by mounting a fan and a "black light" fluorescent lamp on the ceiling. Cleaning and restoring of the paint is performed by illumination of the painted area by an intense UV light.

EXAMPLES

Figure 1:
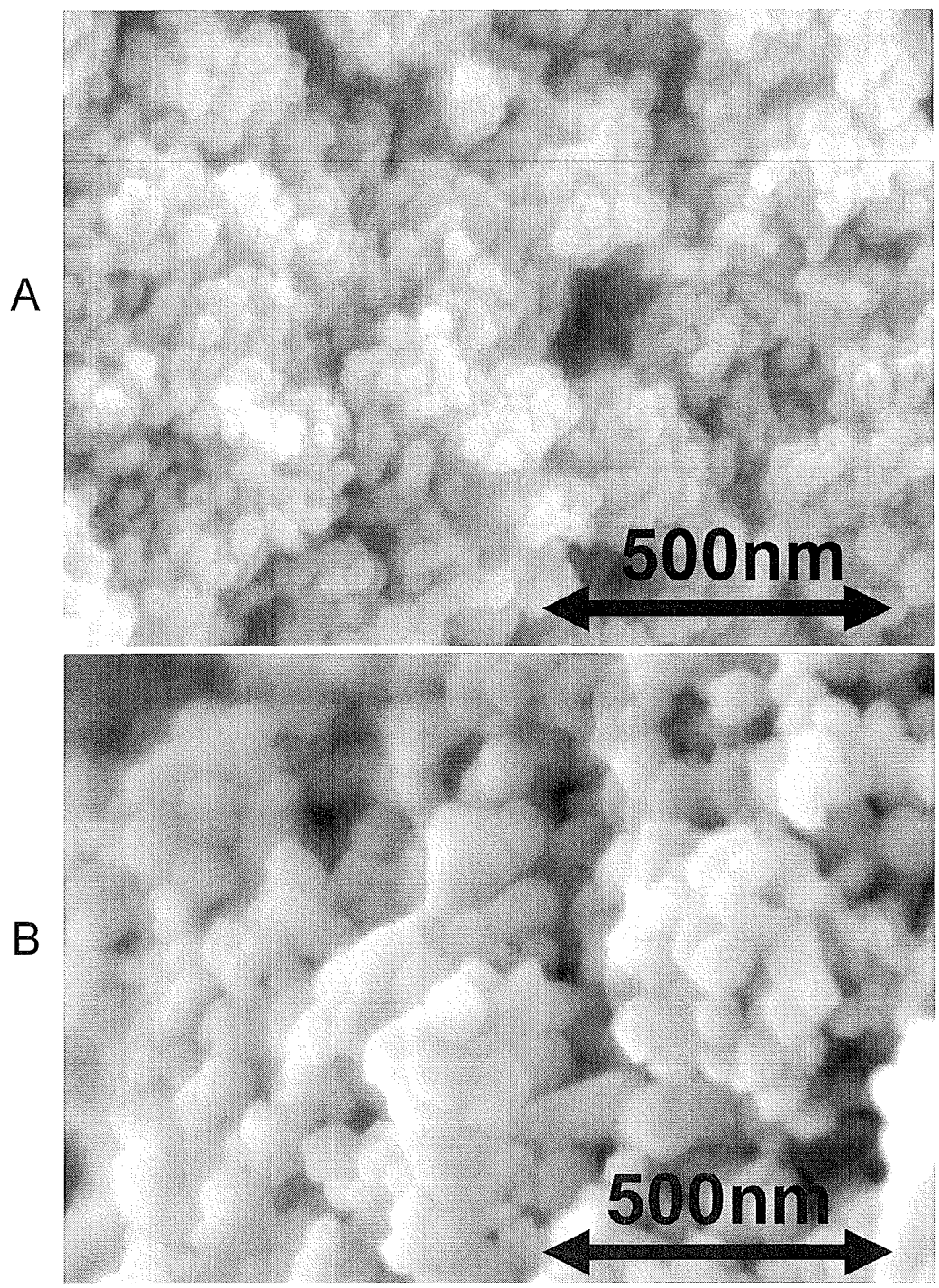
FIG. 1 shows scanning electron microscope (SEM) micrographs of:
A) $TiO_2$ nanoparticles—the non-reactive component of the paint ensuring the photocatalytic functionality B) CaCO$_3$ nanoparticles—the reactive component of the paint
Figure 2:
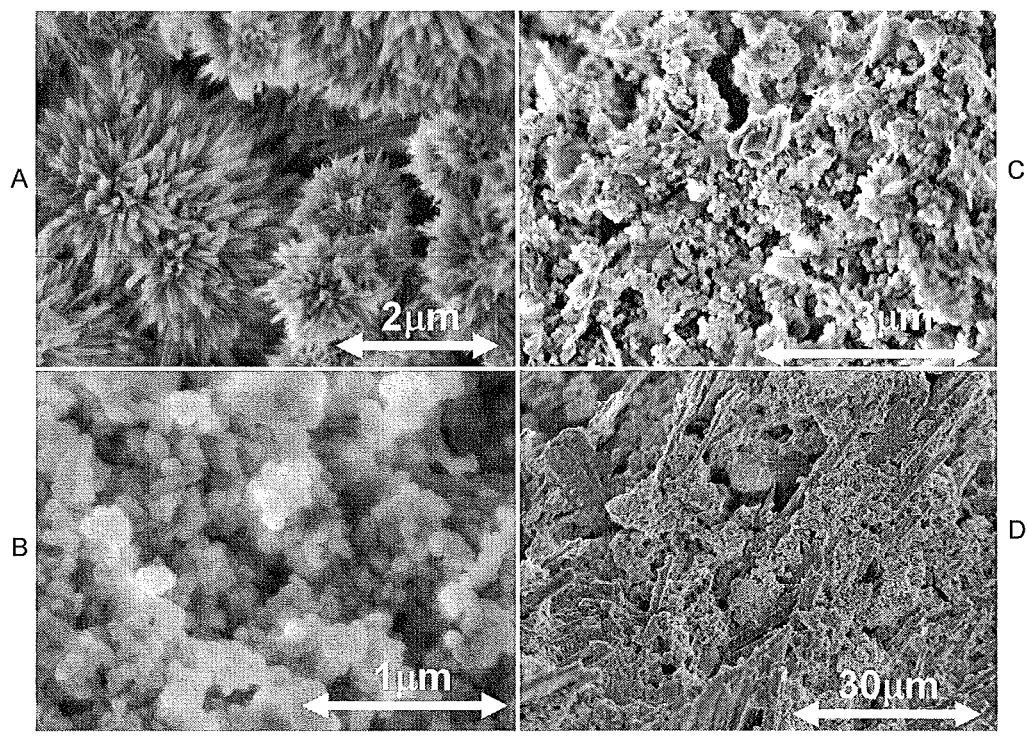
FIG. 2 shows SEM micrographs of:
A) Nanoparticles of the copper based active component, created by the reaction of nano-calcium carbonate with copper sulfate (CaCO$_3$ with CuSO$_4$).
B) Nanoparticles of the silver based active component, created by the reaction of nano-calcium carbonate with silver sulfate (CaCO$_3$ with AgSO$_4$).
C) Nanoparticles of the zinc based active component, created by the reaction of nano-calcium carbonate with zinc sulfate (CaCO$_3$ with ZnSO$_4$).
D) The mixture of TiO$_2$ nanoparticles and the zinc based active component, created by the reaction with nano-calcium carbonate (CaCO$_3$) are incorporated onto the porous structure of gypsum, which was also created in the reaction of nano-calcium carbonate (CaCO$_3$) with ZnSO$_4$ at elevated temperature (100° C.).
Figure 3:
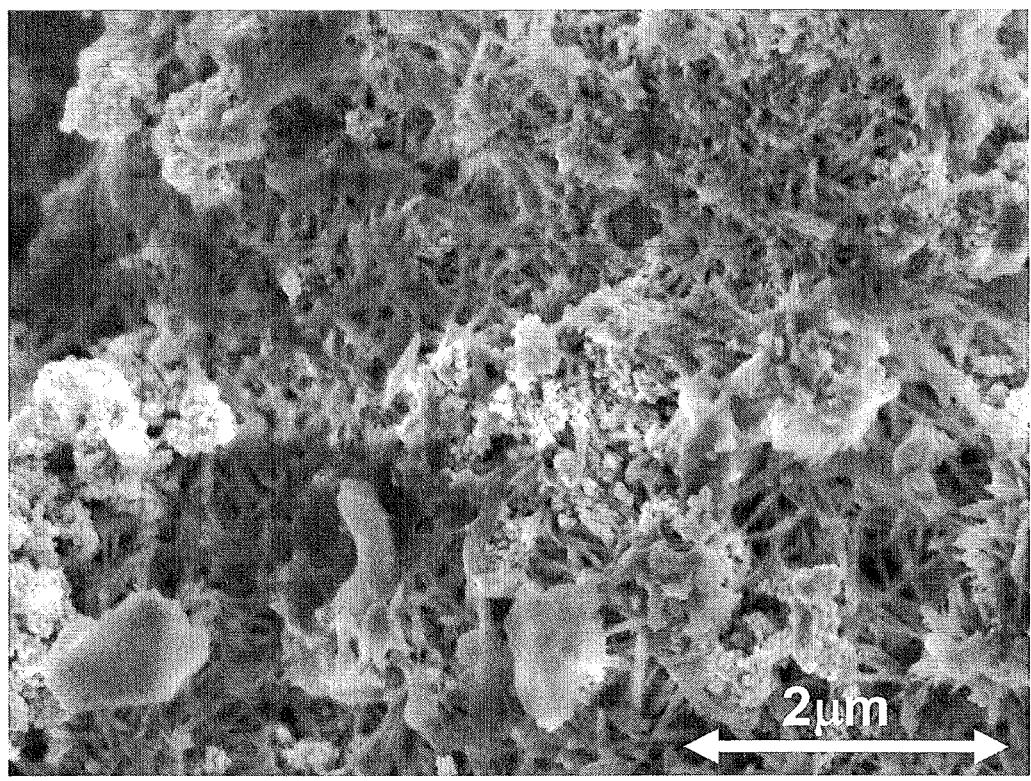
FIG. 3 shows a SEM micrograph of the multifunctional paint, containing TiO$_2$ nanoparticles incorporated into the structure created by the reaction of nano-calcium carbonate with 2.5 wt % ZnSO$_4$ water solution.

The following examples illustrate, but do not limit, the present invention.

Example 1

As a first step, water suspension of nano-calcium carbonate—CaCO$_3$ and calcium hydrate—Ca(OH)$_2$ mixture in the weight ratio 9:1 was applied on the wall which was previously painted with an acrylic paint. The suspension contained 20 wt % of both components. This layer created the reactive base for the second component of the composite multifunctional paint. After the first layer dried, a suspension containing 7 wt % of TiO$_2$ nanoparticles in the 2.5 wt % ZnSO$_4$ solution was sprayed on the treated surface as a second step. Practically inert TiO$_2$ doesn't participate in any reaction and it is consequently mounted onto the fibrous structure created by the reaction of the nano-calcium carbonate and calcium hydroxide mixture with ZnSO$_4$. The created paint coat is shown in the picture 3. Although the exact composition of the created paint is not exactly known, it is possible to assume that the paint consists of clusters of TiO$_2$ nanoparticles, which are mechanically mounted onto the structure consisting of nanoparticles of zinc oxide, hydrated zinc oxide, zinc carbonate, partially unreacted CaCO$_3$ and CaO, and gypsum—CaSO$_4$.2H$_2$O.

This 5 micrometers thick paint coat, in the daylight, exhibits four times faster cleaning of the air contaminated by the smoke from one cigarette compared to the reference room. The cigarette smell vanishes completely from the room painted with the multifunctional paint after 20 minutes, leaving no musty smell in contrast to the reference room. The antibacterial functionality of this paint coat shows an instant killing of all bacteria contamination, contrary to the reference acrylic paint, where the bacteria *E. Coli* did not completely die even after four hours.

Example 2

As a first step, a water suspension of CaCO$_3$ and TiO$_2$ nanoparticles in the weight ratio 1:1 was applied on the stuccoed surface. The suspension contained 10 wt % of both substances. After this layer dried, it created the reactive base for the second component of the composite multifunctional paint. As a second step 5 wt % ZnSO$_4$ solution was sprayed on the surface. Similar to the first example, after the paint dried, the inert TiO$_2$ was mounted onto the porous, fibrous structure created by the reaction of nano-calcium carbonate with zinc sulfate. In the daylight, the paint coat shows a similar ability to remove odors as in the example 1.

Example 3

Ten liters of a solution containing 0.9 kg of zinc sulfate and 5 grams of silver sulfate was added into 10 liters of a cold water suspension containing 1 kg of nano-calcium carbonate and 1 kg of TiO$_2$ nanoparticles and mixed intensively. After few hours this slowly reacting mixture was applied with the roller on walls previously painted with an acrylic paint. After the paint coat completely dried, a porous photocatalytic layer about 10 micrometers thick was created. It had a strong antibacterial functionality even without the presence of light.

Example 4

One liter of a cold water suspension containing 0.07 kg of nano-calcium carbonate and 0.1 kg of TiO$_2$ nanoparticles was prepared first. In a separate container, active components were prepared in one liter of water suspension by the reaction of 0.1 kg CuSO$_4$ and 5 grams of AgNO$_3$ with 0.2 kg of nano-calcium carbonate. Both suspensions were blended together and properly mixed. After that, one liter of water solution containing 0.1 kg of zinc sulfate was mixed in. The created mixture was slightly diluted with water and applied on the surface with a brush. After the paint completely dried, the result was a porous layer of the multifunctional paint about 50 micrometers of thickness.

Example 5

A suspension containing 7 wt % of TiO$_2$ nanoparticles in 10 wt % water solution of ZnSO$_4$ was sprayed on a concrete surface. After drying the result was a paint coat with the TiO$_2$ nanoparticles incorporated onto the porous and fibrous structure created by the reaction of the concrete calcium components with ZnSO$_4$. The created layer shows very good photocatalytic activity, it destroys lichen, algae and other microorganisms, which cause erosion of concrete. The paint maintains the concrete surface free from these organisms for at least one year.

INDUSTRIAL UTILIZATION

The multifunctional paints are usable as sanitary paint coats in hospitals, biolabs, offices and residential buildings, namely in rooms for allergics. They remove repulsive odors from rooms and work places, for example in restaurants. These painted surfaces are also suitable for air cleaning from the automobile exhalations, for example for facades of buildings, concrete sound barriers and so on. They are conveniently applicable in the livestock production to lower the risk of infectious diseases of the particular breed.

The invention claimed is:
1. A multifunctional paint coat with the photocatalytic and sanitary effects, based on TiO$_2$ nanoparticles, wherein TiO$_2$ nanoparticles are mounted onto nanoparticles of a highly porous inorganic substance, wherein the highly porous inorganic substance is a reaction product of two components, wherein the first component is at least one water insoluble compound of calcium selected from the group of nano-cal- cium carbonate, lime, calcium hydroxide and mixtures thereof and the second component is at least one water soluble metal sulfate selected from the group of copper sulfate, zinc sulfate, silver sulfate or their mixtures, and wherein the content of $TiO_2$ is from 5 to 90 weight percent, and the thickness of the photocatalytic paint coat is in the range from 0.1 to 100 micrometers.

2. The multifunctional paint coat according to claim 1, wherein the weight ratio of the second component (sulfate) to the first component (insoluble calcium compound) is from 0.1:1 to 10:1.

* * * * *